Figure 1:
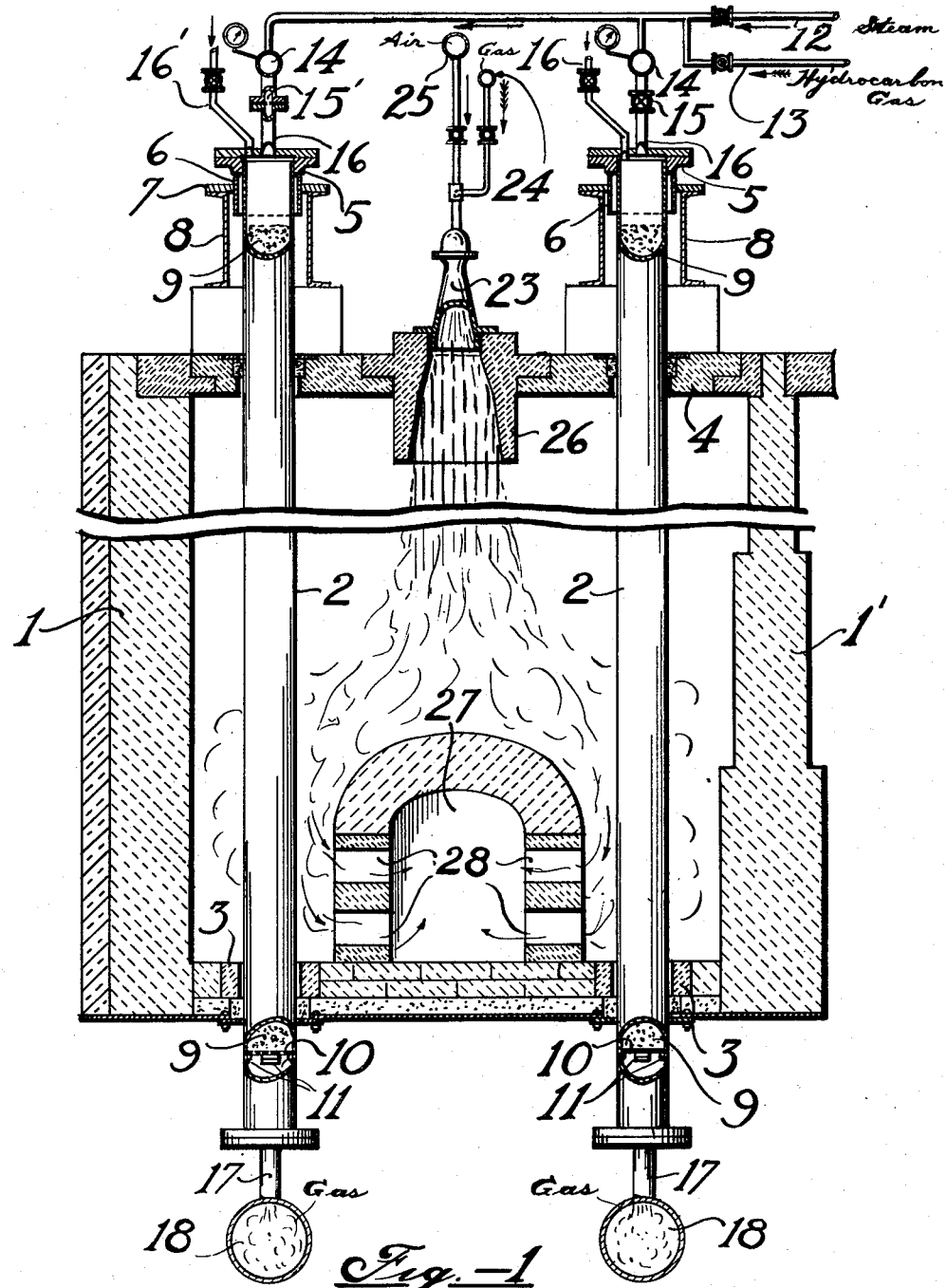
Figure 2:
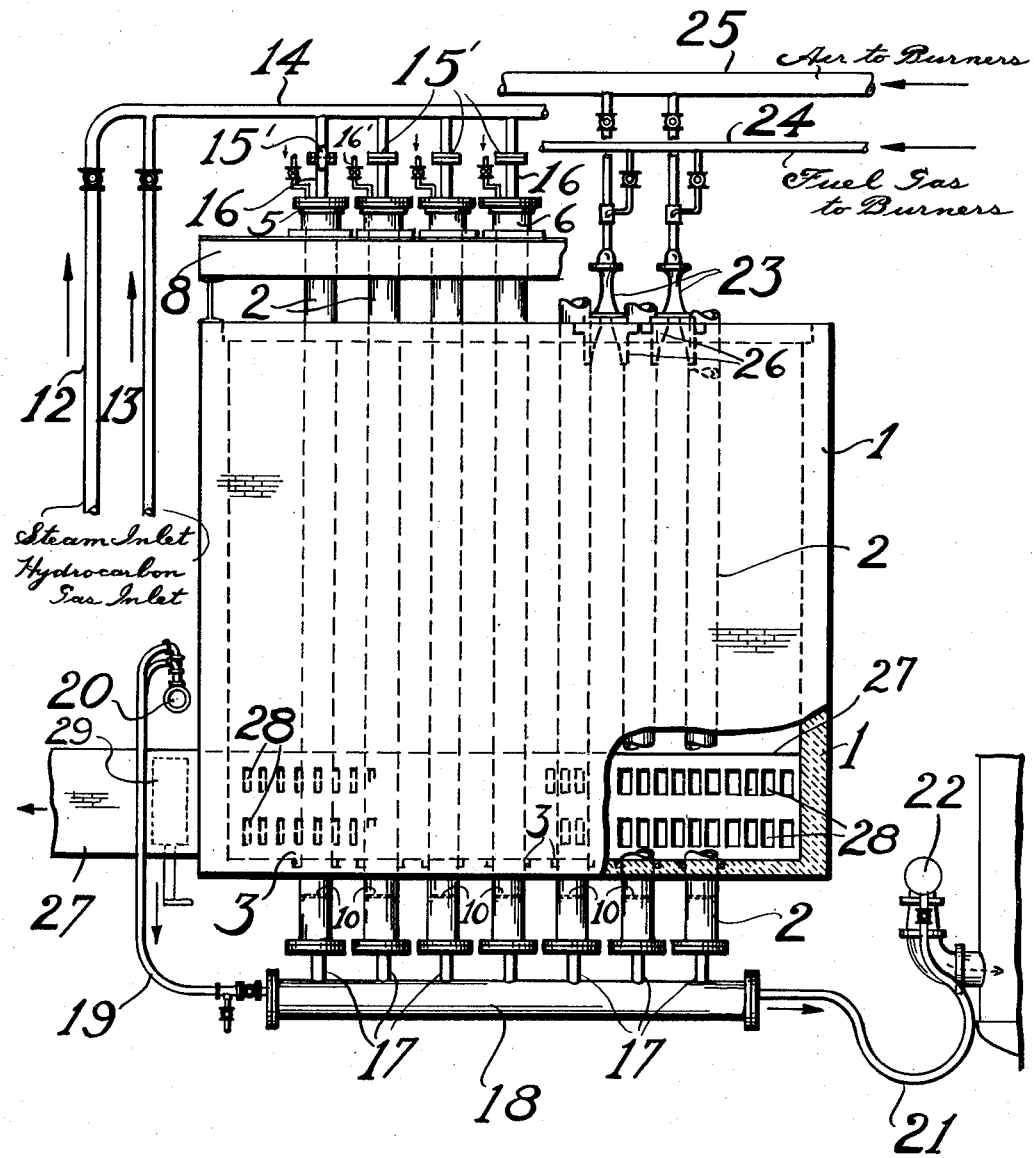

UNITED STATES PATENT OFFICE 2,028,326

APPARATUS FOR THE PRODUCTION OF HYDROGEN

William V. Hanks, Baton Rouge, La., George H. Freyermuth, Elizabeth, and George Potts, Hillside, N. J., assignors to Standard Oil Development Company, a corporation of Delaware Application January 23, 1931, Serial No. 510,608

1 Claim. (Cl. 23—288)

The present invention relates to a convenient and efficient apparatus for use in catalytic reactions involving the application of heat to gases and vapors. This apparatus is especially adapted to the art of producing gas rich in free hydrogen from hydrocarbon gas with steam or other compounds containing oxygen which may react with the carbon of the hydrocarbons. The invention will be fully understood from the following description and the drawings which illustrate one form of apparatus suitable for the purpose.

The drawings are two views in sectional elevation of an apparatus constructed according to the present invention.

Referring to the drawings a furnace 1 constructed preferably of fire brick contains two rows of tubes 2, placed vertically in planes parallel to the side walls of the furnace. Only one section of the furnace is shown, but it is understood that any number of similar sections, separated by dividing walls 1', may be used. The tubes are constructed of an alloy of iron preferably with nickel and chromium suitable to withstand the temperatures required in the process as disclosed below. The tubes project through the top and bottom of the furnace passing through the tiles 3 at the bottom and 4 at the top. The projecting ends of the tubes and the outer surface of the furnace may be covered with insulating material (not shown). The tubes 2 are supported by means of a convenient support at the top of each tube, for example the upper flange 5 of tube 2 rests on a short collar 6 through which the tube may pass freely. This collar screws into plate 7 which in turn rests upon the steel beams 8. These beams are conveniently supported at each end by the furnace housing. The bottom flanges of the tubes are removable, and any tubes may be removed from the furnace by breaking the inlet and exit connections and lifting the tube vertically through the collar 6.

The tubes 2 are filled with a suitable catalytic material 9 which is supported by a perforated alloy plate 10. Suitable catalysts will be disclosed below. The plate is removable and rests in the tube on support 11 which is attached to the inner surface of the tube. Tubes may be removed and replaced even when filled with catalyst, in the manner already described, and the catalyst may be placed in the tubes, or removed therefrom, both while the tubes are in the furnace or are at some more convenient place, which may be remote from the furnace. A travelling crane or an overhead rail has been found to be a convenient means of transferring the tubes. Additional catalyst may be added to the tubes in place and even while in operation through valved pipes 16'.

The gases or vapors are supplied through convenient lines which may differ from those shown in the drawings as the circumstances of any particular construction and process may require. In this example steam is forced through line 12 and hydrocarbon gas through line 13 into header 14, from which the mixture is distributed through valves 15 or distributing orifices 15' in lines 16 connecting each tube separately to the header.

The gases leaving the bottom of the tubes pass through separate lines 17 into headers 18. These headers are supported by lines 17 from the tubes, and are free to move with the expansion and contraction of the tubes. All other connections to the headers are flexible, and are made through pipe bends, expansion joints, or other suitable means. In the drawings additional steam for use in subsequent catalytic conversion of carbon monoxide to carbon dioxide is supplied by pipe 19 from header 20, thereby simultaneously cooling the hot exit gases from the tubes, and preheating the additional steam. This premixing of gas and steam permits marked economies in the insulation of header 18 and in the reduction of heat losses therefrom.

The gas and steam mixture passes through pipe 21 to header 22, which is connected to additional equipment of any desired nature. Pipes 19 and 21 are formed in bends which permit the free movement of header 18.

Burners 23 of which one is shown are placed in the top of furnace 1 and between the rows of tubes 2. In the burner shown gas is admitted through pipe 24, and air through pipe 25, but it is understood that other types of burners using suitable combustible materials may be used. The flame from this burner passes into the furnace through the refractory block 26. This block is designed to present a radiant surface of high temperature to the flames, and to direct the combustion gases downwardly in a direction parallel to the tubes. The block causes the flame to burn in a very short zone, and prevents impingement of the flame with the tube walls. The products of combustion pass downwardly through the furnace and into an inner flue 27 through the ports 28. For some types of operation, particularly at high capacity, it may be preferable to omit the inner flue. The flue connects at the rear of the furnace with an outer duct and stack (not shown) through which the products of combustion are released to the atmosphere. A suitable damper 29 in the duct from each furnace is used for controlling the flow of combustion gases to the stack.

It is understood that suitable heat interchange equipment or waste heat boilers and the like may be used to recover the additional heat remaining in the flue gas leaving furnace 1. The air used for combustion may be conveniently preheated by heat interchange with the flue gas.

The inner flue 27 consists of an arched passage of fire brick or other refractory material having a closed roof and ports 28 along both sides as shown. The distribution and size of these ports are so arranged to give a larger open area at the front of the furnace decreasing to a smaller open area at the back thereby insuring a substantially vertical passage downwardly of the combustion gases and an even distribution of heat throughout the length of the furnace.

In the present process a mixture of steam and hydrocarbon gas is admitted to headers 14 which are connected to each tube by individual valves or orifices in pipes 16. It is understood that either the steam or the hydrocarbons or a mixture of both may be passed through preheating equipment (not shown) before being admitted to the catalytic zones. Orifices 15' are so adjusted that an equal volume of the gas mixture is admitted to each tube. This adjustment is secured by making the orifice opening of such size, with regard both to the amount of gas flowing therethrough and to the pressure carried in header 14, that the amount of gas passed through each orifice is substantially constant and is independent of normal variation in the pressure in the individual tubes. With such an adjustment the increase in the density of the gas admitted to a tube of relatively high back pressure compensates for the correspondingly decreased pressure drop across its orifice. While sharp edged orifices are preferred, orifices of other types, and even valves may be used instead. The normal pressure drop across the orifices is preferably about equal to the absolute pressure at the tube inlet, but lower or higher pressure drops may also be used, which should not be less than about 15% of the absolute pressure in the header. Suitable connections for determining tube inlet and header pressures are indicated on the drawings.

The entering gas mixture passes downwardly through the catalyst mass 9 where it is heated rapidly to temperature of 1000° F. to 1800° F.

In operation at high gas rates the furnace temperatures of 1400° F. to 2000° F. and above are sufficient to cause a marked decrease in the strength of alloys suitable for catalyst tubes. The strength of slender tubes of these alloys becomes so low at these temperatures that serious bending and distortion occurs if the tubes are supported at the bottom. The suspension of the tubes at the top, having the bottom header and connections free to move with the thermal expansion of the tube, prevents this distortion. Also, the upper section of the tube, carrying the greatest weight, is kept relatively cool by the entering steam and hydrocarbon mixture and by the absorption of large amounts of heat in the reaction of the hydrocarbons and steam.

The temperature of the furnace is maintained above 1000° F. and preferably above about 1400° F. by the combustion of a suitable gaseous fuel admitted with air through burners 23.

The necessary temperature of the furnace depends upon the rate at which hydrocarbon gas is passed through the tubes and upon the proportion of hydrocarbon gas to steam used. If relatively large quantities of steam are admitted with the hydrocarbon gas and the rate of admission is slow permitting a long time of contact with the catalyst the furnace temperatures may be low, but if high capacity is desired it is desirable to use relatively small amounts of steam only slightly in excess of that theoretically required for complete reaction with the hydrocarbons and to pass the mixture at a high rate through the tubes. This may require very high furnace temperatures above 1600° F. and even above 2000° F. depending upon the gas rates used. By this method the hydrocarbon gas is converted almost quantitatively to carbon oxides and hydrogen.

When high capacity operation is desired special care must be taken with regard to combustion conditions in the furnace and to the materials of construction used. It is desirable for the sake of combustion efficiency to use as little excess air as possible, but the amount of air admitted should always be slightly in excess of that required for the complete combustion of the fuel as a reducing atmosphere may be harmful to some alloys otherwise suitable for use in our apparatus. The excess air should be from 15% to 100% when furnace temperatures of 1800° to 2000° F. are used.

The tubes should be constructed of alloys or metals of suitable strength and resistance to corrosion at the operating conditions used. For temperatures above 1400° F. the tubes are preferably constructed of suitable heat resistant alloys such as alloys of nickel and chromium with or without iron in varying proportion. Alloys containing approximately equal amounts of nickel and chromium are especially resistant to corrosion at high temperatures. For example, an iron alloy containing 24% chromium, 20% nickel, 0.7% manganese, 1.07% silicon, and 0.22% carbon is well adapted for use in our apparatus. It will be understood that other alloys containing metals not disclosed herein may be used without affecting the true nature of our invention.

Sufficient space should be left between the tubes to permit the transfer of heat by radiation from the combustion zone to the furnace walls and to all exposed surfaces of the tubes. It is desirable to place the tubes in the furnace with a distance between the walls of adjacent tubes approximately equal to the tube diameters. The tubes may also be about this same distance from the furnace walls. It is desirable to leave ample space between the two rows of tubes in each section for combustion in order to lessen the danger of local overheating of parts of the tubes nearest the burners. This space may be suitably about 9 tube diameters in width.

The most suitable dimensions of the tubes will vary with the temperature and heat transfer requirements of the process for which the apparatus is designed. In the catalytic reformation of hydrocarbon with steam at high gas rates of 75 to 300 volumes of hydrocarbon gas per volume of catalyst per hour, a tube 5 to 25 feet in length and about 3 to 8 inches in diameter is preferred. A catalyst volume of about 2 to 8 cubic feet per tube is desirable.

It is understood that the spacing and location of the tubes in the furnace, and the ratio of tube heating surface to catalyst volume, may be varied within wide limits according to the heat transfer requirements of the particular type of operation desired.

Suitable catalysts for the production of hydrogen should possess high activity and great physical strength, and should shrink very little at the operating temperature used. Oxides or metals of the iron group, admixed with aluminum oxide, form desirable catalyst. Calcium and magnesium oxides and silica may be added to secure catalysts of greater strength at high temperatures. Phosphoric acid with alumina and nickel oxide produces a very active catalyst which shrinks very little at high temperatures. A specially suitable catalyst is prepared from nickel oxides, magnesia and kaolin. The catalyst is usually prepared in the form of a paste, cut into small cubes, and dried slowly. It is then heated slowly, in the presence of steam, to a temperature equal to or up to 500° F. higher than the operating temperature at which it is intended to be used, and then held at this temperature for about 24 to 48 hours. This roasting treatment causes most of the shrinkage which takes place on heating and the catalyst is ready for use after this treatment. Dried catalyst may also be charged into the tubes, and the final roasting step is then performed with the tubes in place in the furnace, and additional catalyst is added to make up for the shrinkage. The catalyst should not be roasted at so high a temperature as to cause a serious decrease in catalytic activity.

The exit gas mixture in the reformation of hydrocarbon with steam consists almost entirely of hydrogen, oxides of carbon, and excess steam, and usually contains a high percentage of carbon monoxide. The gas may be cooled immediately after leaving our apparatus if a hydrogen-carbon monoxide mixture is desired for the production of synthetic alcohol or other uses. If a gas consisting almost entirely of free hydrogen is desired it is preferable to pass the exit gas mixture, with added steam, over iron oxides or other suitable catalysts in the known manner for the conversion of carbon monoxide to carbon dioxide. The gas is then cooled, the carbon dioxide scrubbed out by known means, and hydrogen of about 95% purity is easily secured.

As an example of the operation of this process 304 cubic feet per hour of cracking coil release gas, averaging C 1.43 H 4.58 is passed after removal of sulfur with 82.5 pounds of steam through a vertical tube containing 4.45 cubic feet of catalyst in a heated length of 21 feet. The temperature of the catalyst is about 250° F. at the top of the tube and 1750° F. at the bottom and the temperature of the outside of the tube wall is about 1300° F. at the top and 1900° F. at the bottom. The inner walls of the furnace average about 1900° F. throughout. The gas leaving the furnace has the following analysis:

1.0% $CH_4$, 10% $CO_2$, 15% CO, 1.0% $N_2$ and 73% $H_2$.

Our apparatus may be operated as described or for any other desired process at any desired pressure above or below atmospheric pressure which is limited only by the maximum strength of the materials at the operating temperature used. In the process described the adverse equilibrium effect of increased pressure may be offset by use of higher temperature, or by using larger proportion of steam to hydrocarbons.

Our invention is not to be limited by any theory of the mechanism of the reactions nor to any specific example which may have been given for purposes of illustration, but only by the following claim in which we wish to claim all novelty inherent in this invention.

We claim:

Apparatus of the class described, comprising a furnace of refractory material and a plurality of reaction tubes supported at the upper end outside the furnace and arranged in two rows along the sides and passing freely through the roof and floor of said furnace, means permitting free expansive movement of the tubes below the point of support, means for firing the furnace at the upper end between the rows of tubes, means for withdrawing the combustion gases comprising a flue at the bottom of the furnace between said rows of tubes, a plurality of openings from the flue into the bottom of the furnace between said rows, the area of said openings being graduated with regard to their distance from the point of offtake to an outer stack from the flue and being smallest nearest said point of offtake whereby the pressure is substantially equal at all points within the furnace adjacent to the openings, and means for admitting a fluid to one end of the tubes and for removing said treated fluid from the other end.

WILLIAM V. HANKS.
GEORGE H. FREYERMUTH.
GEORGE POTTS.